United States Patent

[11] 3,585,616

[72] Inventor Nicholas J. Mazzeo
Mahopac, N.Y.
[21] Appl. No. 788,992
[22] Filed Dec. 24, 1968
[45] Patented June 15, 1971
[73] Assignee International Business Machines Corporation
Armonk, N.Y.

[54] INFORMATION STORAGE ELEMENT
17 Claims, 3 Drawing Figs.

[52] U.S. Cl. .......... 340/174TF, 340/174 QB, 340/174 GP, 340/174 ZB, 340/174 BC, 340/174 PC
[51] Int. Cl. .......... G11c 11/14
[50] Field of Search .......... 340/174

[56] References Cited
UNITED STATES PATENTS
3,456,247 7/1969 English .......... 340/174
OTHER REFERENCES
IBM TECHNICAL DISCLOSURE BULLETIN, " Keeper Structures For Coupled-Film Memories" by Chang et al., Vol. 9, No. 1; 6/66, P-69 & 79, copy in 340-174TF
IBM TECHNICAL DISCLOSURE BULLETIN, " Memory Device Using Anisotropic Metal Keeper" by Anacker; Vol 8; No 11; 4/66 P-1615 & 1616; copy in 340-174TF

*Primary Examiner*—Stanley M. Urynowicz, Jr.
*Attorneys*—Hanifin and Jancin and T. J. Kilgannon, Jr.

ABSTRACT: A coupled film magnetic memory element is disclosed which incorporates a field applying element which is disposed between a substrate and the lower of two orthogonally disposed conductors. In a preferred embodiment, a pair of closed easy axis (CEA) magnetic films are disposed about a bit conductor. These elements are disposed orthogonally relative to a word conductor and a field applying magnetic material which is disposed in underlying and coextensive relationships with the word line. A conductive substrate is disposed adjacent the field applying film and supports all the above described elements. In arrangements having fast pulse rise times, a pulse applied to the word line produces a high field in the field applying film such that for a given amount flux to be made available for switching a storage film, a substantially smaller word current is required. In addition, because the bit line is spaced further from the substrate, it presents a high impedance and consequently provides a higher sense voltage at the input of a sense amplifier.

INVENTOR
NICHOLAS J. MAZZEO
BY Thomas J. Kilgannon Jr
ATTORNEY

INFORMATION STORAGE ELEMENT

BACKGROUND OF THE INVENTION

1. Field of the Invention

This invention relates generally to magnetic thin film memory elements having anisotropic characteristics which store binary information in either of two possible remanent magnetic states. More specifically it relates to a memory element which incorporates a field applying element disposed between a conductor and the ground plane of the memory element. The field applying element acts to apply a high magnetic field to memory films which are symmetrically disposed about and coextensive with an orthogonally arranged conductor. As a result of this arrangement, lower word currents are required to supply a required switching field and, in a preferred embodiment, the bit line impedance is greater than that using prior art structures.

2. Description of the Prior Art

In prior art arrangements, magnetic storage films are disposed symmetrically about a word or bit line and are disposed immediately above the substrate. Thus, the storage film is relatively close to the substrate and, when a field is applied from an orthogonally disposed conductor, only a small portion of the flux generated enters an associated keeper. The keeper which is of relatively high permeability, then applies a field increased by a factor equal to the permeability of the keeper to the storage film. When the filed is strong enough the film is switched. A rather high current is required to accomplish switching because the resulting field has to pass through a nonmagnetic conductor associated with the storage film resulting in increased current requirements.

In addition, where closed easy axis (CEA) films are used, the bit line impedance is relatively low and lower threshold sense amplifiers are required. The ideal situation would be to have a high bit line impedance and reduced word line current requirements. The high bit line impedance can be achieved in closed hard axis (CHA) films, but higher bit line currents are required because in the (CHA) regime the bit line current sees the same conditions as does the word line current in the (CEA) regime. There is, therefore, no structural arrangement known to those skilled in the art which provides high bit line impedance and reduced word current requirements at the same time.

SUMMARY OF INVENTION

The present invention, in its broadest aspect consists of a pair of orthogonally related conductors disposed above ground plane. A pair of anisotropic magnetic films are disposed on opposite sides of one of the conductors while a field applying element is disposed between the other of said conductors and the ground plane. The arrangement permits a desired switching flux to be coupled to a storage element using a lower current than previously required.

In accordance with a more specific aspect of the invention, a magnetic memory element is provided which has a pair of closed easy axis (CEA) magnetic films disposed about a first conductor. The first conductor is disposed orthogonally relative to a second conductor which is spaced from a conductive ground plane by a film of magnetic material. The second conductor is a word line and applies a field which is parallel to the hard axis of the coupled magnetic films. The second conductor, a bit line, applies a field in one direction or the other parallel to the direction of the easy axis of the coupled films and sets the remanent state of the magnetic films in either of two possible conditions. Using the above arrangement, a higher bit line impedance is obtainable using prior art arrangements. In addition, because of the film of magnetic material between the ground plane and the word line, a higher field can be applied to the storage film than previously. In other words, to apply the flux required to switch or read a storage film, a smaller current than previously required is now required.

It is, therefore, an object of the invention to provide a magnetic memory element which requires reduced word current over that required in prior art magnetic memory elements.

Another object is to provide a magnetic memory element which has a high bit line impedance.

Still another object is to provide a magnetic memory element which incorporates a field applying element adjacent the ground plane to provide the maximum flux to a storage film with a minimum of current.

The foregoing and other objects, features and advantages of the present invention will be apparent from the following more particular description of a preferred embodiment of the invention as illustrated in the accompanying drawings.

DESCRIPTION OF A PREFERRED EMBODIMENT

Figure 1:
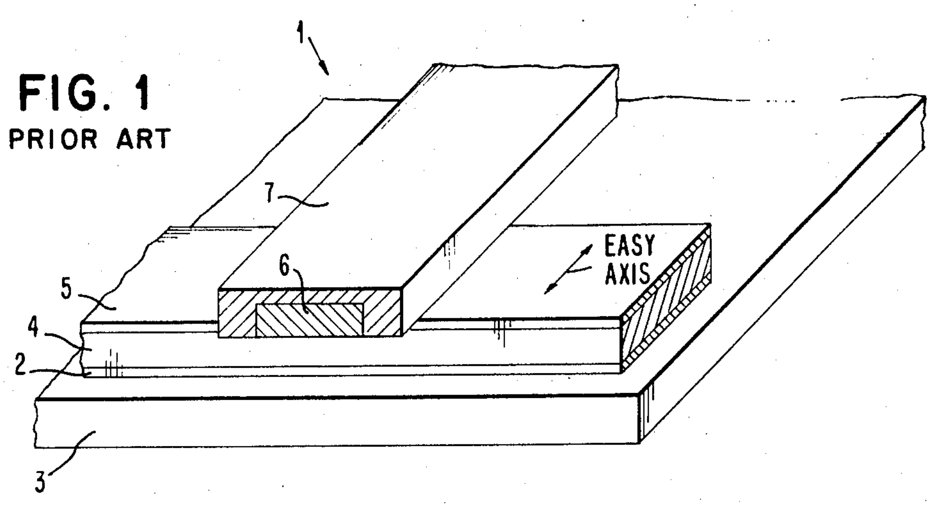
FIG. 1 PRIOR ART
FIG. 1 is a partial cross-sectional isometric view of a magnetic memory element using (CEA) films arranged in accordance with teachings of the prior art.

Before discussing a preferred embodiment of the present invention, a discussion of a prior art memory element similar to that shown in FIG. 1 should prove helpful in pointing out the patentable novelty of the present invention. FIG. 1 shown a partial cross-sectional isometric view of a magnetic memory element 1. Memory element 1 is schematic to the extent that various insulating or nonmagnetic layers have not been shown for purposes of simplifying the following explanation. Memory element 1 is a closed easy axis (CEA) arrangement in which a storage film 2 is shown disposed between a conductive substrate 3 and a conductor 4 which in the arrangement shown is a bit sense conductor. Another magnetic film 5 is shown in FIG. 1 disposed atop conductor 4. Film 5 completes a magnetic circuit with storage film 2. The easy axis of magnetic films 2 and 5 is oriented perpendicular to the longitudinal axis of conductor 4 and is represented by the double-ended arrow in FIG. 1. Another conductor 6 disposed orthogonally relative to conductor 4 extended over films 2 and 5 and in the (CEA) arrangement is the word line. A keeper 7 is positioned over word line which performs the function of closing the word line flux.

In operation, the structure of FIG. 1 provides orthogonally disposed magnetic fields to films 2 and 5 by means of current pulses applied to conductors 4 and 6. A pulse on word line 6 orients flux in the hard direction (parallel to the longitudinal axis of conductor 4) while a pulse on conductor 4 of positive or negative polarity, tilts the hard axis orientation in one direction or the other along the easy axis thereby storing a binary "one" or "zero".

Because of well-known considerations in a wire-over-ground-plane configuration as formed by word line 6 and substrate 3, a major part (90 percent) of the magnetic field due to a current pulse in word line 6 appears instantaneously between word line 6 and substrate 3. Keeper 7 disposed over word line 6 provides a closed magnetic path for the word line flux and an increment of flux enhanced by the permeability constant of the magnetic material from which keeper 7 is formed. Keeper 7, in effect, reduces demagnetization fields and as a result reduces the word line current required to produce a given required flux.

From the foregoing discussion, it can be seen that in addition to reducing demagnetizing fields, keeper 7 provides an increment of flux which is useful in switching magnetic films 2 and 5 which is equal to the amount of flux present times the permeability of the magnetic keeper 7.

Figure 2:
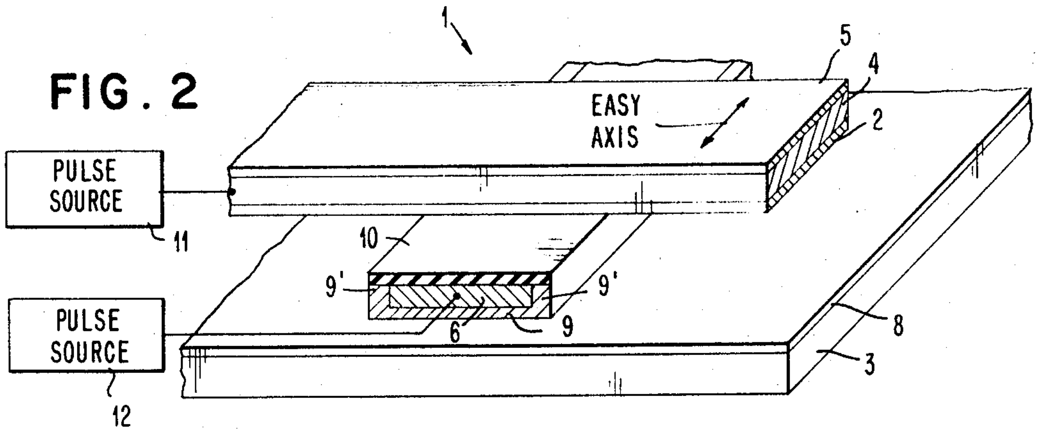
FIG. 2 is a partial cross-sectional isometric view of a magnetic memory element using (CEA) films which incorporates a field applying element and has a structural arrangement in accordance with the teaching of the present inventors.

FIG. 2 shows a partial cross-sectional isometric view of a magnetic memory element 1 which is structurally arranged to the advantage of the fact that the major part (90 percent) of the magnetic field produced by passing a current through a conductor in a wire-over-ground plane configuration appears instantaneously between the conductor and the ground plane.

The elements which are the same in FIGS. 1 and 2 have been given the same reference characters. In FIG. 2, conductive substrate 3 is covered by a layer of insulation 8. A field applying element 9 is disposed immediately on the surface of insulation layer 8. Conductor or word line 6 is disposed on top of element 9 and is covered with a layer of insulation 10. A conductor or bit line 4 is orthogonally arranged relative to word line 6 and has magnetic films 5 and 2 over and underneath it, respectively. Field applying element 9 has extensions 9′ which are spaced from magnetic film 2 by insulation layer 10 and form therewith a magnetic circuit having a minimum path length high reluctance gap. As with FIG. 1, the magnetic films 2, 5 are closed easy axis (CEA) films with the easy axis oriented perpendicular to the longitudinal axis bit line 4.

When a current pulse is applied to word line 6 in the arrangement of FIG. 2, a major part of the magnetic field (90 percent) appears instantaneously between word line 6 and substrate 3. The major part of the magnetic field available thus enters field applying element 9 and, in conjunction with extensions 9′ of element 9 and film 2, form a magnetic circuit having a minimum air gap. The amount of field present is multiplied by the permeability factor of element 9 and because of this a much larger field is available to switch storage film 2 of FIG. 2 than is available in the arrangement of FIG. 1. It should be recalled that only 10 percent of the available field times the permeability constant of the magnetic material was available to switch magnetic film 2 in FIG. 1.

From the foregoing, then, it may be seen that the simple juxtaposition of elements results in a magnetic memory element which has reduced word drive current requirements in that a smaller current can provide flux sufficient to switch the magnetic films. Also, the magnetic field produced does not have to penetrate conductor 4 as it does in FIG. 1, thereby further reducing drive requirements. Because the bit line 4 is substantially further away from the ground plane or substrate 3 in FIG. 2 compared to its distance form the ground plane in FIG. 1, the bit line has a higher impedance. A higher impedance requires smaller sense currents for the same output voltage and as a result film size is reduced.

The magnetic memory element of FIG. 2 may be manufactured by vacuum deposition techniques, photolithographic and etching techniques well known to those skilled in this art. A typical memory element consists of a substrate 3 of copper or other conductive material having a thickness of 120,000A: an insulation layer 8 of silicon dioxide or Pyre M–L a polyamide resin commercially available from DuPont under that trade name or other insulating material having a thickness of 3,000A: a field applying element of permalloy or other suitable magnetic material having a permeability of about 10,000 and a thickness of 2,000A, a word line 6 of copper or other conductive material having a thickness of 30,000A, an insulating layer 10 of silicon dioxide, Pyre M–L or other suitable insulating material having a thickness of 20,000A, and a pair of magnetic films 2, 5 each of Permalloy and having a thickness of 1,000A sandwiching a conductor or bit line 4 having a thickness of 60,000A.

Information is stored in portions of the magnetic films 2, 5 at the intersection of conductors 4, 6 and current pulses are applied from pulse sources 11, 12 shown connected to conductors 4, 6, respectively, in FIG. 2. The pulses applied from sources 11, 12 may have rise times in order of ten nanoseconds but, the structure of FIG. 2 is not limited to operation with pulses of this character. The structure of FIG. 2 is advantageously used in any size thin film memory but its most useful application is foreseen in microminiaturized memory arrangements.

Figure 3:
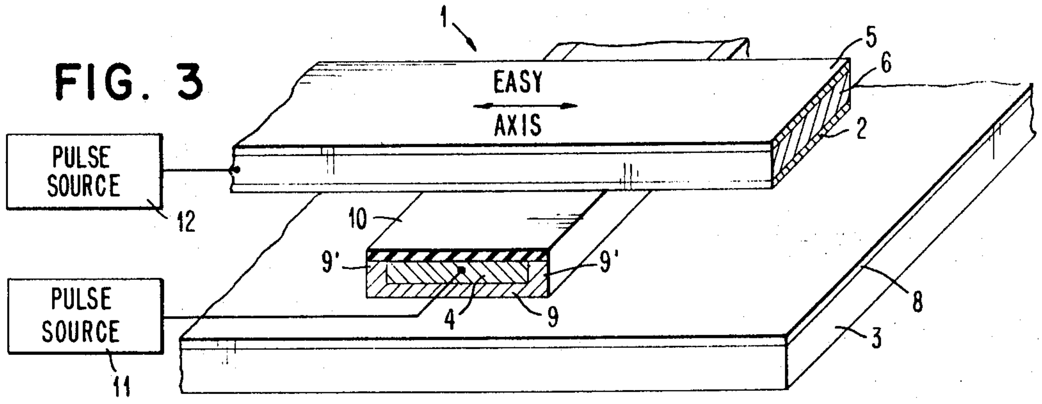
FIG. 3 is a partial cross-sectional isometric view of a magnetic memory element using (CHA) films which incorporates a field applying element and has a structural arrangement in accordance with the teaching of the present invention.

Referring now to FIG. 3, a partial cross-sectional isometric view of a magnetic memory element 1 is shown which operates with magnetic films having a closed hard axis (CHA). Corresponding elements in FIGS. 2 and 3 have been given the same reference number. Structurally, memory elements 1 in both FIGS. 2 and 3 present the same appearance. In FIG. 3 though, the bit lines 4 and the word lines 6 have been interchanged. In addition, the easy axis of films 2, 5 is oriented parallel to the longitudinal axis of word line 6.

When a current pulse is applied from source 12, via word line 6, the major part of the resulting magnetic field appears instantaneously between word line 6 and substrate or ground plane 3. As a result, the major portion of the field is enhanced by the permeability of element 9 and, the current drive to produce the same switching field as previously required is reduced. It should be obvious, from a consideration of FIG. 3, that the bit line impedance is reduced over that shown in the preferred embodiment of FIG. 2. While low bit line impedance is not usually desired, the tradeoff between reduced bit line impedance and reduced word current may be worthwhile under certain restricted design circumstances.

With respect to the permeability of element 9 relative to the permeability of films 2, 5, the permeability of element 9 is at least five times higher than that of films 2, 5. The higher the permeability of element 9, the more the drive current requirements are reduced. Permeability of a magnetic film can be controlled by controlling the thickness. Permeability increases with increasing thickness.

While the invention has been particularly shown and described with reference to a preferred embodiment thereof, it will be understood by those skilled in the art that the foregoing and other changes in form and details may be made therein without departing from the spirit of the inventor's.

What I claim is:

1. A magnetic memory element comprising:
   - a ground plane,
   - a word conductor and a bit conductor disposed in orthogonal relationship to each other above said ground plane,
   - current means connected to said word conductor for providing a region of maximum aiding magnetic field between said conductors and said ground plane,
   - a pair of magnetic films disposed on opposite sides of one said pair of conductors, and
   - a field applying keeper element disposed in said region of maximum magnetic field between said ground plane and said conductors.

2. A magnetic memory element according to claim 1 wherein said one of said pair of conductors is a bit-sense line.

3. A magnetic memory element according to claim 1 wherein said other of said pair of conductors is a word line.

4. A magnetic memory element according to claim 1 wherein said one of said pair of conductors is a word line.

5. A magnetic memory element according to claim 1 wherein said other of said pair of conductors is a bit-sense line.

6. A magnetic memory element according to claim 1 wherein said pair of magnetic films are closed easy axis (CEA) films.

7 A magnetic memory element according to claim 1 wherein said pair of magnetic films are closed hard axis (CHA) films.

8. A magnetic memory element according to claim 1 wherein said field applying element is a film of magnetic material.

9 A magnetic memory element according to claim 1 wherein said field applying element is a film of nonoriented magnetic material.

10. A magnetic memory element according to claim 1 wherein said field applying element is a film of oriented magnetic material.

11. A magnetic memory element according to claim 1 further including a source of pulses electrically coupled to each of said pair of conductors for applying orthogonally oriented magnetic fields to switch said films into either of two possible remanent states.

12. A magnetic memory element according to claim 1 further including a sense amplifier connected to one of said pair of conductors.

13. A magnetic memory element according to claim 1 wherein the permeability of said field applying element is at least five times greater than the permeability of said pair of magnetic films.

14. A magnetic memory element comprising:

a conductive substrate, a first layer of insulating material overlying said substrate, first and second orthogonally related bit and word conductors disposed over said substrate, current means connected to said word conductor for providing a region of maximum magnetic field between said conductors and said substrate, a second layer of insulating material disposed on said first conductor, a pair of storage magnetic films disposed on opposite sides of said second conductor and coextensive therewith, and a field applying keeper element disposed in said region of maximum magnetic field between and contiguous with (said first conductor) one of said conductors and said first layer of insulation.

15. A magnetic memory element according to claim 14 wherein said conductive substrate and said conduction are copper, said nonmagnetic material is Pyre M–L, said magnetic films and said field applying films are of a nickel-iron composition.

16 A magnetic memory element including a pair of orthogonally related word and bit conductors disposed above a ground plane, current means connected to said word conductor for providing a region of maximum magnetic field between said conductors and said ground plane, and at least a single magnetic storage film disposed adjacent one of said pair of conductors characterized by a field applying keeper element, the major portion of which is interposed between said conductors and said ground plane in said region of maximum magnetic field.

17. A magnetic memory element according to claim 16 wherein said field applying element includes extensions spaced from and extending toward said magnetic storage film.